US012688017B2

(12) United States Patent
Coenen et al.

(10) Patent No.: US 12,688,017 B2
(45) Date of Patent: Jul. 21, 2026

(54) INTEGRATED DEVELOPMENT ENVIRONMENTS FOR GENERATING MACHINE LEARNING MODELS

(71) Applicant: Google LLC, Mountain View, CA (US)

(72) Inventors: Andy Coenen, Mountain View, CA (US); Ludovic Peran, Mountain View, CA (US); Michael Terry, Mountain View, CA (US); Aaron Donsbach, Mountain View, CA (US)

(73) Assignee: Google LLC, Mountain View, CA (US)

( * ) Notice: Subject to any disclaimer, the term of this patent is extended or adjusted under 35 U.S.C. 154(b) by 322 days.

(21) Appl. No.: 18/604,444

(22) Filed: Mar. 13, 2024

(65) Prior Publication Data

US 2024/0311100 A1    Sep. 19, 2024

Related U.S. Application Data

(60) Provisional application No. 63/490,229, filed on Mar. 14, 2023.

(51) Int. Cl.
*G06F 8/35* (2018.01)
*G06F 3/0484* (2022.01)
(Continued)

(52) U.S. Cl.
CPC .............. *G06F 8/35* (2013.01); *G06F 3/0484* (2013.01); *G06F 8/34* (2013.01); *G06F 11/3698* (2025.01); *G06N 3/0455* (2023.01); *G06N 3/096* (2023.01)

(58) Field of Classification Search
None
See application file for complete search history.

(56) References Cited

U.S. PATENT DOCUMENTS

2021/0055915 A1* 2/2021 Guo ........................... G06F 8/34
2021/0097402 A1* 4/2021 Ohta ...................... G06N 3/088
(Continued)

FOREIGN PATENT DOCUMENTS

WO      2023022727 A1      2/2023

OTHER PUBLICATIONS

Zhou, "Open-environment machine learning", 2022, National Science Review (Year: 2022).*

(Continued)

*Primary Examiner* — Hossain M Morshed
(74) *Attorney, Agent, or Firm* — Honigman LLP; Brett A. Krueger

(57)      ABSTRACT

A method includes receiving a request indication indicating a GUI interaction by a user on a user device, and in response, providing to the device a response configured to cause the device to display, within a GUI, a structured prompt including a plurality of user input fields, each user input field representing a corresponding training sample and including a first corresponding text input field for capturing input text to be provided to an ML model, and a second corresponding text input field for capturing ground-truth output text. The method also includes receiving, from the device, the training samples, and, in response, adjusting the ML model using the training samples. The method further includes receiving, from the device, test input text, generating, using the adjusted ML model, test output text based on the test input text, and providing, to the user device, the test output text for display within the GUI.

20 Claims, 10 Drawing Sheets

(51) Int. Cl.
  G06F 8/34       (2018.01)
  G06F 11/3698    (2025.01)
  G06N 3/0455     (2023.01)
  G06N 3/096      (2023.01)

(56)                References Cited

U.S. PATENT DOCUMENTS

| | | | |
|---|---|---|---|
| 2022/0156574 A1* | 5/2022 | Anwar | G06N 3/08 |
| 2022/0318517 A1* | 10/2022 | Galitsky | G06F 40/295 |
| 2023/0049418 A1* | 2/2023 | Saha | G06N 3/0464 |
| 2023/0140702 A1* | 5/2023 | Bodigutla | G06F 16/9532 |
| | | | 706/12 |
| 2023/0346280 A1* | 11/2023 | Kim | A61B 5/165 |
| 2024/0054325 A1* | 2/2024 | Ishii | G06N 3/0455 |
| 2024/0311100 A1* | 9/2024 | Coenen | G06F 8/35 |
| 2025/0284724 A1* | 9/2025 | Du | G06F 3/011 |

OTHER PUBLICATIONS

International Search Report and Written Opinion issued in related PCT Application No. PCT/US2024/019809, dated Jul. 5, 2024.
Bryan Wang et al: "Enabling Conversational Interaction with Mobile UI using Large Language Models", arxiv.org, Cornell University Library, 201 Olin Library Cornell University Ithaca, NY 14853, Feb. 17, 2023 (Feb. 17, 2023).

Figure 2F:
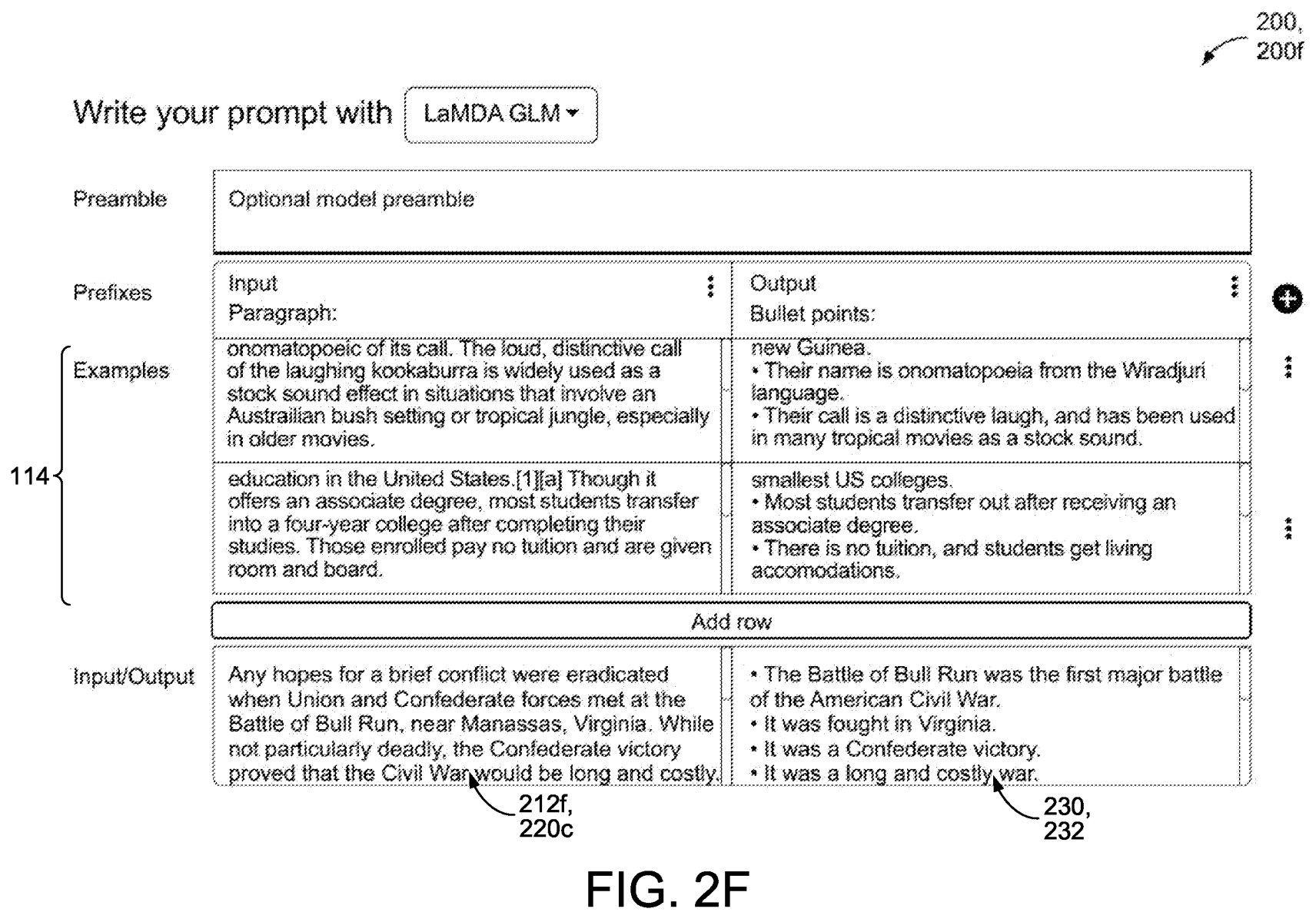

* cited by examiner 200,
200b 200,
200f

Write your prompt with [ LaMDA GLM ▾ ]

Preamble

Optional model preamble

Prefixes

| Input | Output |
|---|---|
| Paragraph: | Bullet points: |

Examples

| | |
|---|---|
| onomatopoeic of its call. The loud, distinctive call of the laughing kookaburra is widely used as a stock sound effect in situations that involve an Australian bush setting or tropical jungle, especially in older movies. | new Guinea.<br>• Their name is onomatopoeia from the Wiradjuri language.<br>• Their call is a distinctive laugh, and has been used in many tropical movies as a stock sound. |
| education in the United States.[1][a] Though it offers an associate degree, most students transfer into a four-year college after completing their studies. Those enrolled pay no tuition and are given room and board. | smallest US colleges.<br>• Most students transfer out after receiving an associate degree.<br>• There is no tuition, and students get living accomodations. |

114

Add row

Input/Output

| | |
|---|---|
| Any hopes for a brief conflict were eradicated when Union and Confederate forces met at the Battle of Bull Run, near Manassas, Virginia. While not particularly deadly, the Confederate victory proved that the Civil War would be long and costly. | • The Battle of Bull Run was the first major battle of the American Civil War.<br>• It was fought in Virginia.<br>• It was a Confederate victory.<br>• It was a long and costly war. |

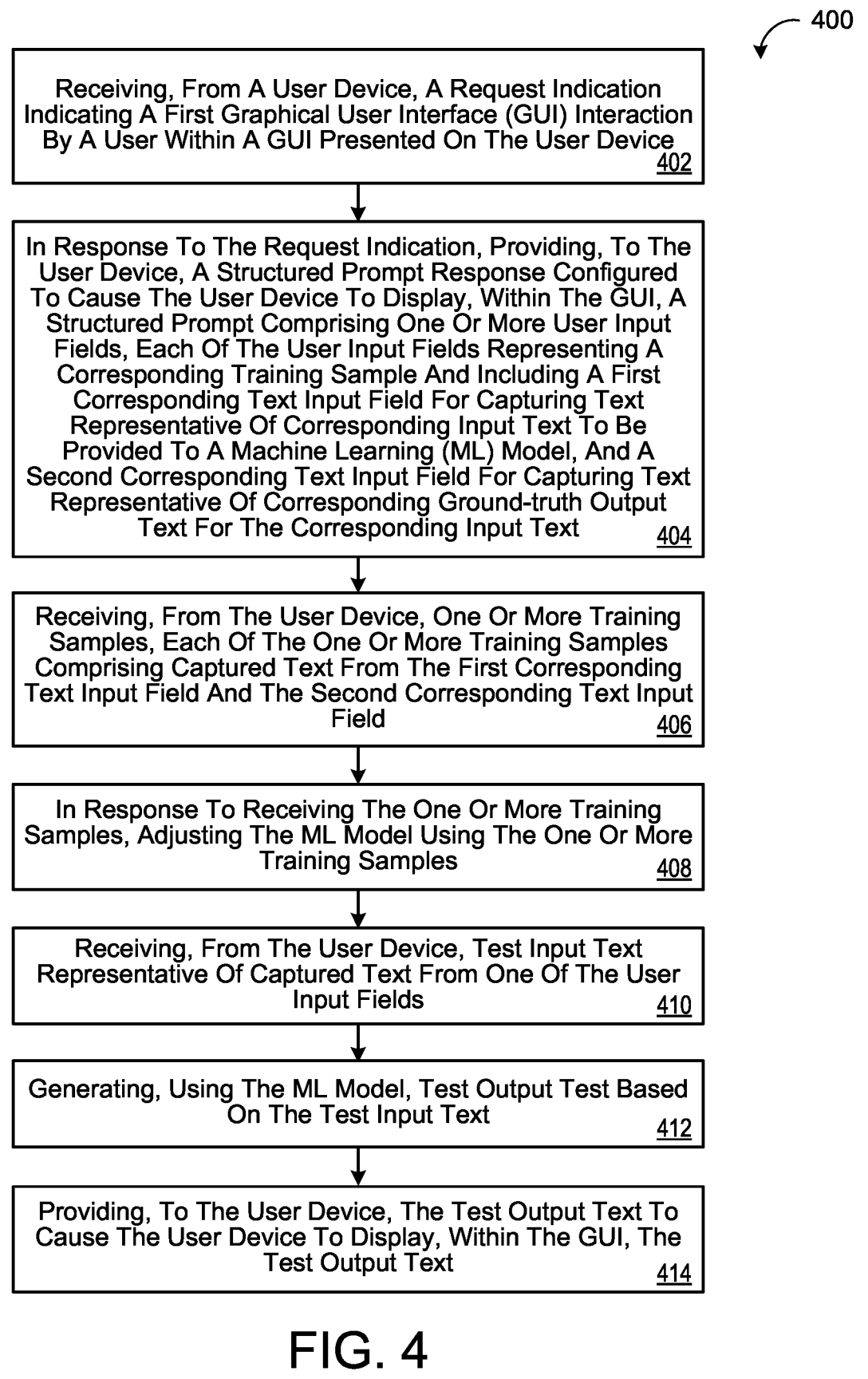

Receiving, From A User Device, A Request Indication Indicating A First Graphical User Interface (GUI) Interaction By A User Within A GUI Presented On The User Device
402

In Response To The Request Indication, Providing, To The User Device, A Structured Prompt Response Configured To Cause The User Device To Display, Within The GUI, A Structured Prompt Comprising One Or More User Input Fields, Each Of The User Input Fields Representing A Corresponding Training Sample And Including A First Corresponding Text Input Field For Capturing Text Representative Of Corresponding Input Text To Be Provided To A Machine Learning (ML) Model, And A Second Corresponding Text Input Field For Capturing Text Representative Of Corresponding Ground-truth Output Text For The Corresponding Input Text     404

Receiving, From The User Device, One Or More Training Samples, Each Of The One Or More Training Samples Comprising Captured Text From The First Corresponding Text Input Field And The Second Corresponding Text Input Field     406

In Response To Receiving The One Or More Training Samples, Adjusting The ML Model Using The One Or More Training Samples     408

Receiving, From The User Device, Test Input Text Representative Of Captured Text From One Of The User Input Fields     410

Generating, Using The ML Model, Test Output Test Based On The Test Input Text     412

Providing, To The User Device, The Test Output Text To Cause The User Device To Display, Within The GUI, The Test Output Text     414

FIG. 4

INTEGRATED DEVELOPMENT ENVIRONMENTS FOR GENERATING MACHINE LEARNING MODELS

CROSS REFERENCE TO RELATED APPLICATIONS

This U.S. Patent Application claims priority under 35 U.S.C. § 119(e) to U.S. Provisional Patent Application No. 63/490,229, filed on Mar. 14, 2023. The disclosure of this prior application is considered part of the disclosure of this application and is hereby incorporated by reference in its entirety.

TECHNICAL FIELD

This disclosure relates to integrated development environments (IDEs) for generating machine learning models.

BACKGROUND

Generative artificial intelligence (AI) is enabling new and transformative applications. Current machine learning (ML) development requires ML and coding expertise and weeks of development.

SUMMARY

One aspect of the disclosure provides a computer-implemented method executed by data processing hardware that causes the data processing hardware to perform operations. The operations include receiving, from a user device, a request indication indicating a graphical user interface (GUI) interaction by a user within a GUI presented on the user device and, in response to the request indication, providing, to the user device, a structured prompt response configured to cause the user device to display, within the GUI, a structured prompt including one or more user input fields, each of the user input fields representing a corresponding training sample. Each of the user input fields includes a first corresponding text input field for capturing text representative of corresponding input text to be provided to a machine learning (ML) model, and a second corresponding text input field for capturing text representative of corresponding ground-truth output text for the corresponding input text. The operations also include receiving, from the user device, one or more training samples, each of the one or more training samples comprising captured text from the first corresponding text input field and the second corresponding text input field and, in response to receiving the one or more training samples, adjusting the ML model using the one or more training samples. The operations further include receiving, from the user device, test input text representative of captured text from one of the one or more user input fields, generating, using the ML model, test output text based on the test input text, and providing, to the user device, the test output text to cause the user device to display, within the GUI, the test output text.

Implementations of the disclosure may include one or more of the following optional features. In some implementations, the structured prompt further includes a model selection input element allowing selection of one of a plurality of different ML models. In some examples, the structured prompt further includes a preamble text input field for identifying the ML model. In some implementations, adjusting the ML model includes using one-shot learning or few-shot learning based on the corresponding training samples. In some examples, the operations further include generating computer code for calling an application programming interface (API), the API configured to provide access to the ML model, and providing the computer code to the user device. Here, the operations may also include receiving, via the API, second test input text, generating, using the ML model, second test output text based on the second test input text, and returning, via the API, the second test output text.

In some examples, each training sample of the one or more training samples includes a corresponding row of a table of the structured prompt. The structured prompt may further include a row addition user input element for indicating a request to add an additional row to the table. In some implementations, the structured prompt further includes an input-prefix text input field for capturing text describing the first corresponding text input field, and an output-prefix text input field for capturing text describing the second corresponding text input field. In some examples, after providing the test output text, the operations further include: receiving, from the user device, one or more additional or refined training samples; in response to receiving the one or more additional or refined training samples, further adjusting the ML model using the one or more additional or refined training samples; receiving, from the user device, second test input text representative of captured text from one of the one or more user input fields; generating, using the ML model, second test output text based on the second test input text; and providing, to the user device, the second test output text configured to cause the user device to display, within the GUI, the second test output text.

Another aspect of the disclosure provides a system including data processing hardware and memory hardware in communication with the data processing hardware. The memory hardware stores instructions that, when executed on the data processing hardware, cause the date processing hardware to perform operations. The operations include receiving, from a user device, a request indication indicating a graphical user interface (GUI) interaction by a user within a GUI presented on the user device and, in response to the request indication, providing, to the user device, a structured prompt response configured to cause the user device to display, within the GUI, a structured prompt including one or more user input fields, each of the user input fields representing a corresponding training sample. Each of the user input fields includes a first corresponding text input field for capturing text representative of corresponding input text to be provided to a machine learning (ML) model, and a second corresponding text input field for capturing text representative of corresponding ground-truth output text for the corresponding input text. The operations also include receiving, from the user device, one or more training samples, each of the one or more training samples comprising captured text from the first corresponding text input field and the second corresponding text input field and, in response to receiving the one or more training samples, adjusting the ML model using the one or more training samples. The operations further include receiving, from the user device, test input text representative of captured text from one of the one or more user input fields, generating, using the ML model, test output text based on the test input text, and providing, to the user device, the test output text to cause the user device to display, within the GUI, the test output text.

Implementations of the disclosure may include one or more of the following optional features. In some implementations, the structured prompt further includes a model selection input element allowing selection of one of a plurality of different ML models. In some examples, the structured prompt further includes a preamble text input field for identifying the ML model. In some implementations, adjusting the ML model includes using one-shot learning or few-shot learning based on the corresponding training samples. In some examples, the operations further include generating computer code for calling an application programming interface (API), the API configured to provide access to the ML model, and providing the computer code to the user device. Here, the operations may also include receiving, via the API, second test input text, generating, using the ML model, second test output text based on the second test input text, and returning, via the API, the second test output text.

In some examples, each training sample of the one or more training samples includes a corresponding row of a table of the structured prompt. The structured prompt may further include a row addition user input element for indicating a request to add an additional row to the table. In some implementations, the structured prompt further includes an input-prefix text input field for capturing text describing the first corresponding text input field, and an output-prefix text input field for capturing text describing the second corresponding text input field. In some examples, after providing the test output text, the operations further include: receiving, from the user device, one or more additional or refined training samples; in response to receiving the one or more additional or refined training samples, further adjusting the ML model using the one or more additional or refined training samples; receiving, from the user device, second test input text representative of captured text from one of the one or more user input fields; generating, using the ML model, second test output text based on the second test input text; and providing, to the user device, the second test output text configured to cause the user device to display, within the GUI, the second test output text.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2F are schematic views of example structured prompts.

FIG. 4 a flowchart of an example arrangement of operations for a method of generating ML models using an IDE.

Like reference symbols in the various drawings indicate like elements.

DETAILED DESCRIPTION

Generative artificial intelligence (AI) and machine learning (ML) are enabling new and transformative applications. However, ML development currently requires ML and coding expertise and weeks of development. Additionally, the lack of tools to accelerate ML development creates a tooling bottleneck. These and other problems combine to make it difficult to build and develop ML and generative AI solutions. Therefore, there is a need for tools for accelerating ML development.

Implementations herein include an integrated development environment (IDE) for providing a graphical user interface (GUI) that allows users to easily generate ML models in minutes instead of weeks. The IDE allows users to easily tune, measure, and improve ML models (e.g., large language models (LLMs)) using integrated safety and performance measures. The IDE allows developers who lack traditional ML or coding expertise to effectively and easily generate ML models such that the IDE can target a wider set of non-ML users. Thus, such developers can effectively and easily generate generative AI solutions.

Figure 1:
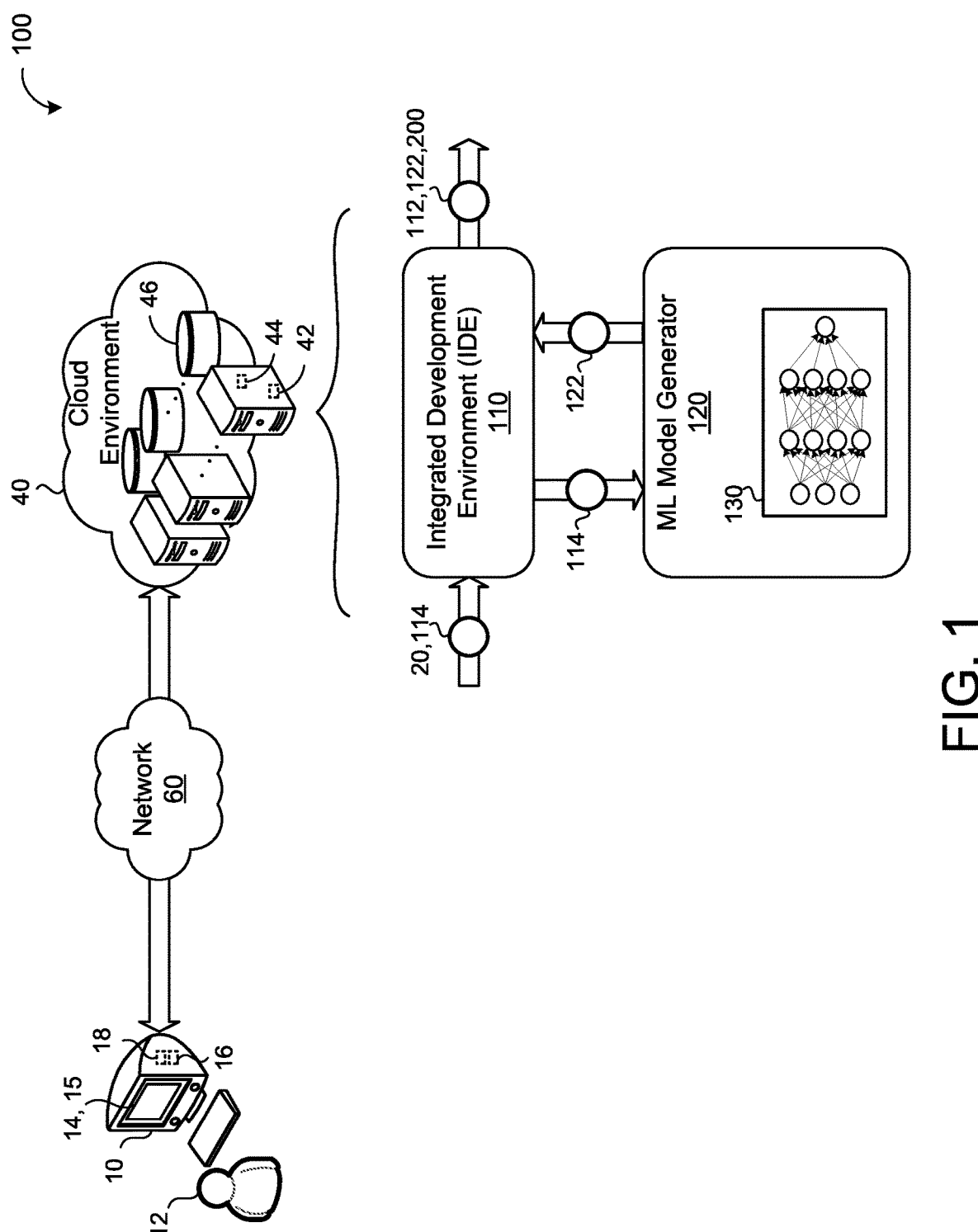
FIG. 1 is a schematic view of an example system including an integrated development environment (IDE) for generating machine learning (ML) models.

FIG. 1 depicts an example system 100 that includes an IDE 110 and an ML model generator 120 that allow a user 12 to generate an ML model 130 using the IDE 110. In some examples, the generated ML model 130 is a functional prototype. In other examples, the generated ML model 130 is a final ML model ready for deployment. The system 100 includes a remote system 40 in communication with one or more user devices 10 via a network 60. Here, each user device 10 may be associated with a respective user 12. The remote system 40 may be a single computer, multiple computers, or a distributed system (e.g., a cloud environment) having scalable or elastic resources 42 including computing resources 44 (e.g., data processing hardware) and/or storage resources 46 (e.g., memory hardware). A data store 48 (i.e., a remote storage device) may be overlain on the storage resources 46 to allow scalable use of the storage resources 46 by one or more of the user devices 10 or the computing resources 44. In some examples, the IDE 110 and the ML model generator 120 are implemented by different computers or computing resources 44 of the remote system 40.

The user device(s) 10 may correspond to any computing device associated with a user 12, such as a desktop workstation, a laptop workstation, or a mobile device (i.e., a smart phone or a tablet). Each user device 10 includes computing resources 16 (e.g., data processing hardware) and/or storage resources 18 (e.g., memory hardware). The data processing hardware 16 executes a graphical user interface (GUI) 14 for display on a screen 15 in communication with the data processing hardware 16.

In the example shown, the remote system 40 executes the IDE 110 for providing the GUI 14 displayed on the screen 15 of the user device 10. However, the IDE 110 may alternatively be executed on an intermediary web server or a proxy frontend server (not shown for clarity of illustration), or on the user device 10. In some implementations, the IDE 110 receives, from the user device 10 via the network 60, a request indication 20 indicating a GUI interaction by the user 12 within the GUI 14 presented on the user device 10. The GUI 14 may be part of an application (e.g., a web browser) executing on the user device 10 that is in communication with the remote system 40. Here, the request indication 20 indicates that the user 12 desires to generate or develop or build or deploy one or more ML models 130 (e.g., an LLM). For example, the user 12 may interact with a button or other user input element (e.g., via a keyboard, mouse, stylus, touch, voice, or any other appropriate forms of input) displayed by the GUI 14.

The IDE 110, in response to the request indication 20, provides, via the network 60, the user device 10 with a structured prompt response 112 that is configured to cause the user device 10 to display, within the GUI 14, a structured prompt 200 that include one or more user input fields 210, 210*a-n* (see FIGS. 2A-2F). Here, the user 12 may use the user input fields 210 to provide inputs representing one or more training samples 114, 114*a-n* for generating or training or adjusting the ML model 130. In some implementations, the user input fields 210 include a first corresponding text input field 212*a* (see FIG. 2A) for capturing text representative of corresponding input text 220*a* (see FIG. 2B) to be provided to a machine learning (ML) model, and a second corresponding text input field 212*b* (see FIG. 2A) for capturing text representative of corresponding ground-truth output text 220*b* (see FIG. 2B) for the corresponding input text 220*a*. The GUI 14 captures inputs provided by the user 12 in the one or more user input fields 210 and provides the corresponding training samples 114 to the IDE 110 via the network 60.

The IDE 110 thereafter provides the training samples 114 to the ML model generator 120. The ML model generator 120 receives the training samples and generates the ML model 130 based on some or all of the training samples 114 captured by the structured prompt 200 (i.e., by training or fine-tuning or otherwise adjusting weights/parameters of the ML model 130). In some examples, the ML model generator 120 generates the ML model 130 by adjusting one or more coefficients of a pre-trained ML model (e.g., an LLM) based on the training samples 114. A pre-trained model refers to a previously trained model that may have been trained on, for example, a very large and diverse dataset. For example, for each of one or more of the training samples 114, the ML model generator 120 may process the corresponding input text using the pre-trained ML model to generate output text. The ML model generator 120 may then generate a loss based on the generated output text and the corresponding ground-truth output text, and update one or more coefficients of the pre-trained ML model based on the loss(-es). In other examples, the ML model generator 120 generates the ML model 130 by adjusting a pre-trained ML model (e.g., an LLM) using one-shot or few-shot learning using one or more of the training samples 114 as prompts. In still further examples, the ML model generator 120 generates the ML model 130 by adjusting a pre-trained ML model (e.g., an LLM) using reinforcement learning from human feedback (RLHF) to increase accuracy of the outputs.

In some implementations, the structured prompt 200 also includes a model selection user input element 214 (see FIG. 2A) allowing selection of the pre-trained ML model from a plurality of different pre-trained ML models, and a preamble text input field 212*c* (see FIG. 2D) for capturing text identifying or describing the pre-trained ML model. In some examples, the remote system 40 also receives, from the user device 10 via the network 60, test input text 220*c* (see FIGS. 2E and 2F) representative of captured text from one of the plurality of user input fields 210. The ML model generator 120 then generates, using the ML model 130, test output text 230 (see FIG. 2F) based on the test input text 220*c*, and provides, to the user device 10 via the network 60, the test output text 230 to cause the user device 10 to display, within the GUI 14, the test output text 230. Here, the test input text 220*c* may be based on one or more of the training samples 114.

In some instances, after providing the test output text 230, the ML model generator 120 receives, from the user device 10 via the network 60, one or more additional training samples 114 or one or more refined training samples 114 and, in response to receiving the additional or refined training samples 114, further adjusts the ML model 130 using the one or more additional or refined training samples

114. Alternatively, the ML model generator 120 may restart training of the ML model 130 based on the additional or refined training samples 114. The IDE 110 may thereafter receive, from the user device 10 via the network 60, second test input text 220*c* representative of captured test input text from one of the plurality of user input fields 210, generate, using the further adjusted ML model 130, second test output text 230 based on the second test input text 220*c*, and provide, to the user device 10 via the network 60, the second test output text 230 to cause the user device 10 to display, within the GUI 14, the second test output text 230.

In some implementations, after the user 12 is satisfied with the performance of the ML model 130, the ML model generator 120 generates computer code 122 for calling an application programming interface (API) configured to provide access to the ML model 130. In some examples, the ML model generator 120 configures the API to provide the user device 10 access to the ML model 130 within the IDE 110 for using the ML model 130 to generate output text based on input text. Additionally or alternatively, the API may be utilized separately from the GUI 14 or the IDE 110. Notably, the computer code 122 for calling the API may be integrated with other computer code for integrating functionalities of the ML model 130 with other functionalities performed by data processing hardware. In the example shown, the IDE 110 returns the computer code 122 to the user device 10 via the network 60. In some examples, the remote system 40 receives test input text 220*c* from the user device 10 via the API and the network 60, generates, using the generated ML model 130, test output text 230 based on the test input text 220*c*, and returns the test output text 230 to the user device 10 via the API and the network 60.

Figure 2A:
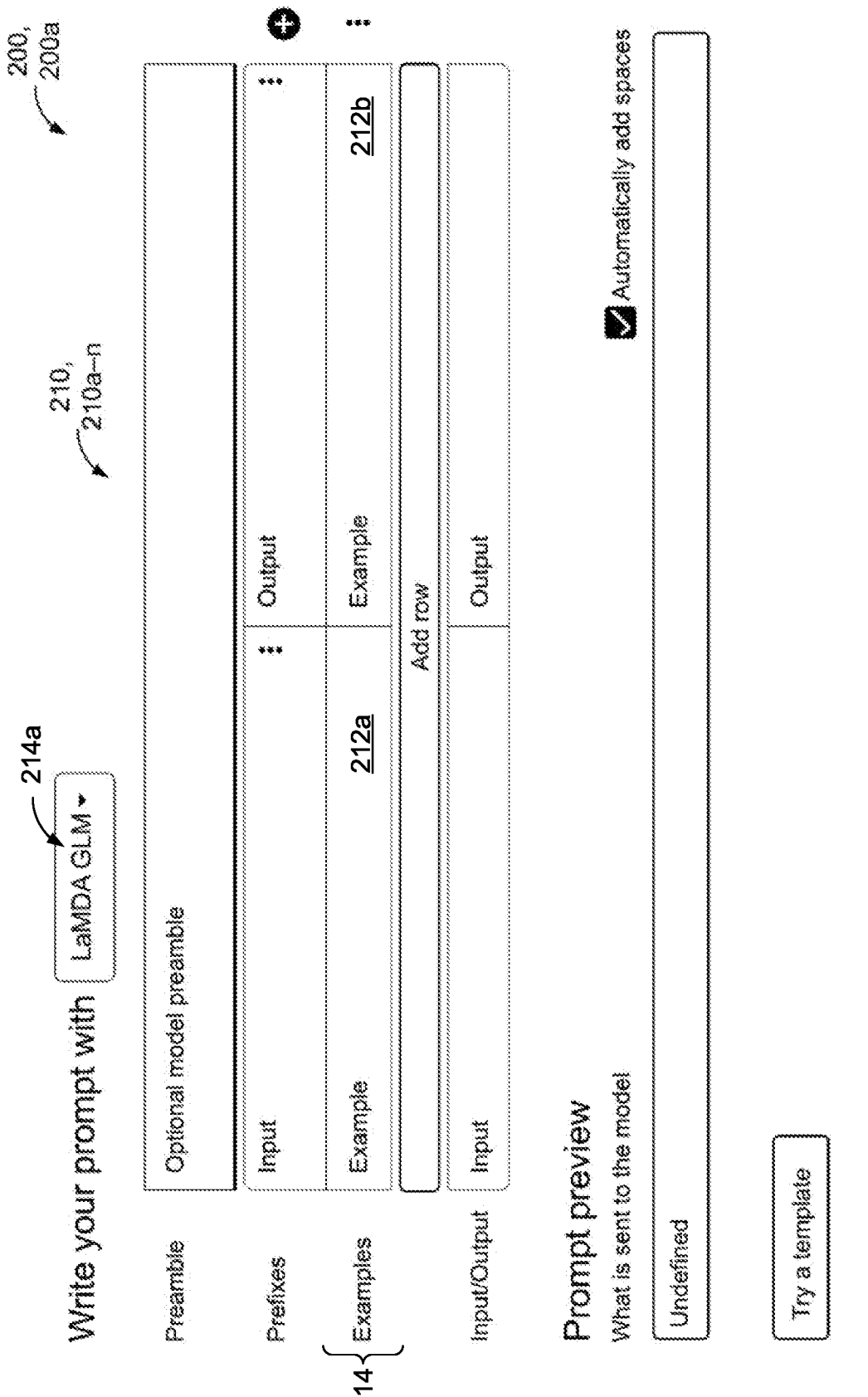
Figure 2B:
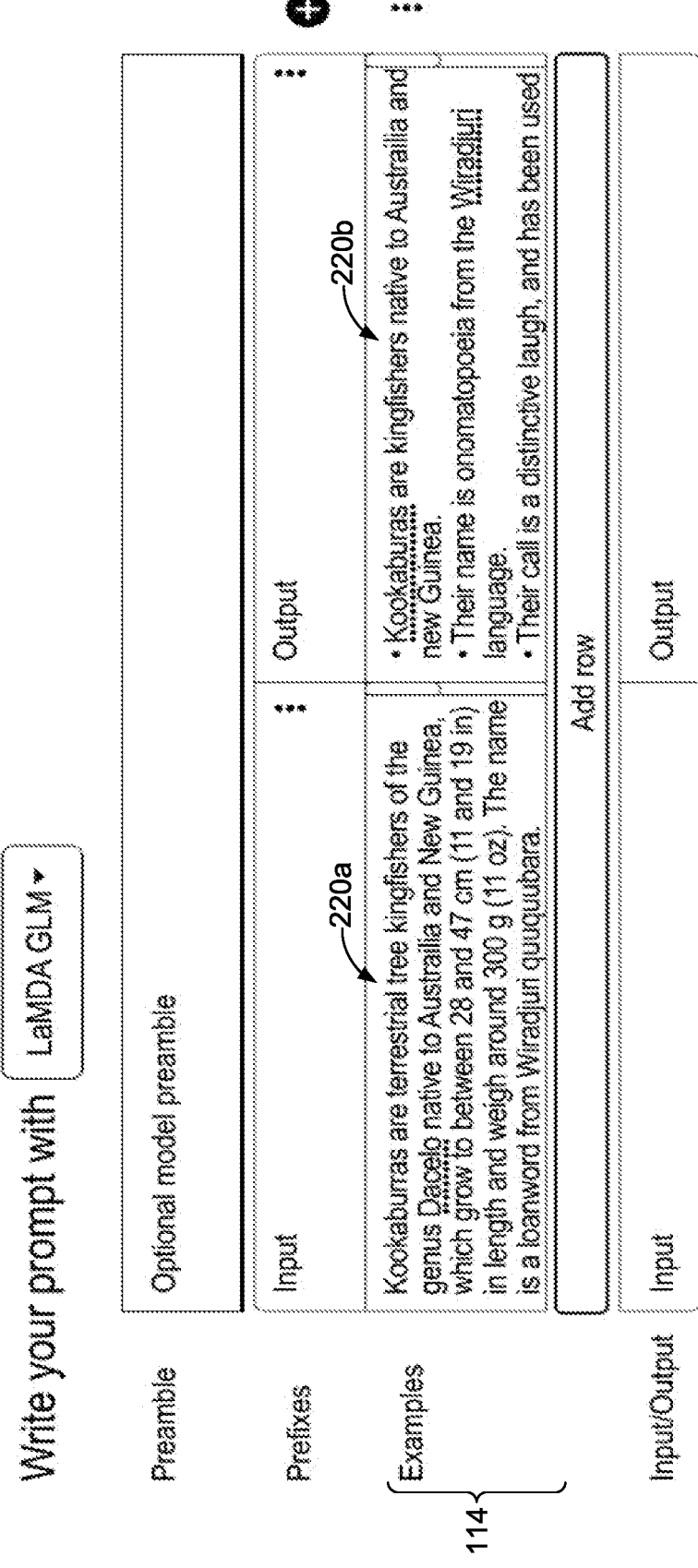
Figure 2C:
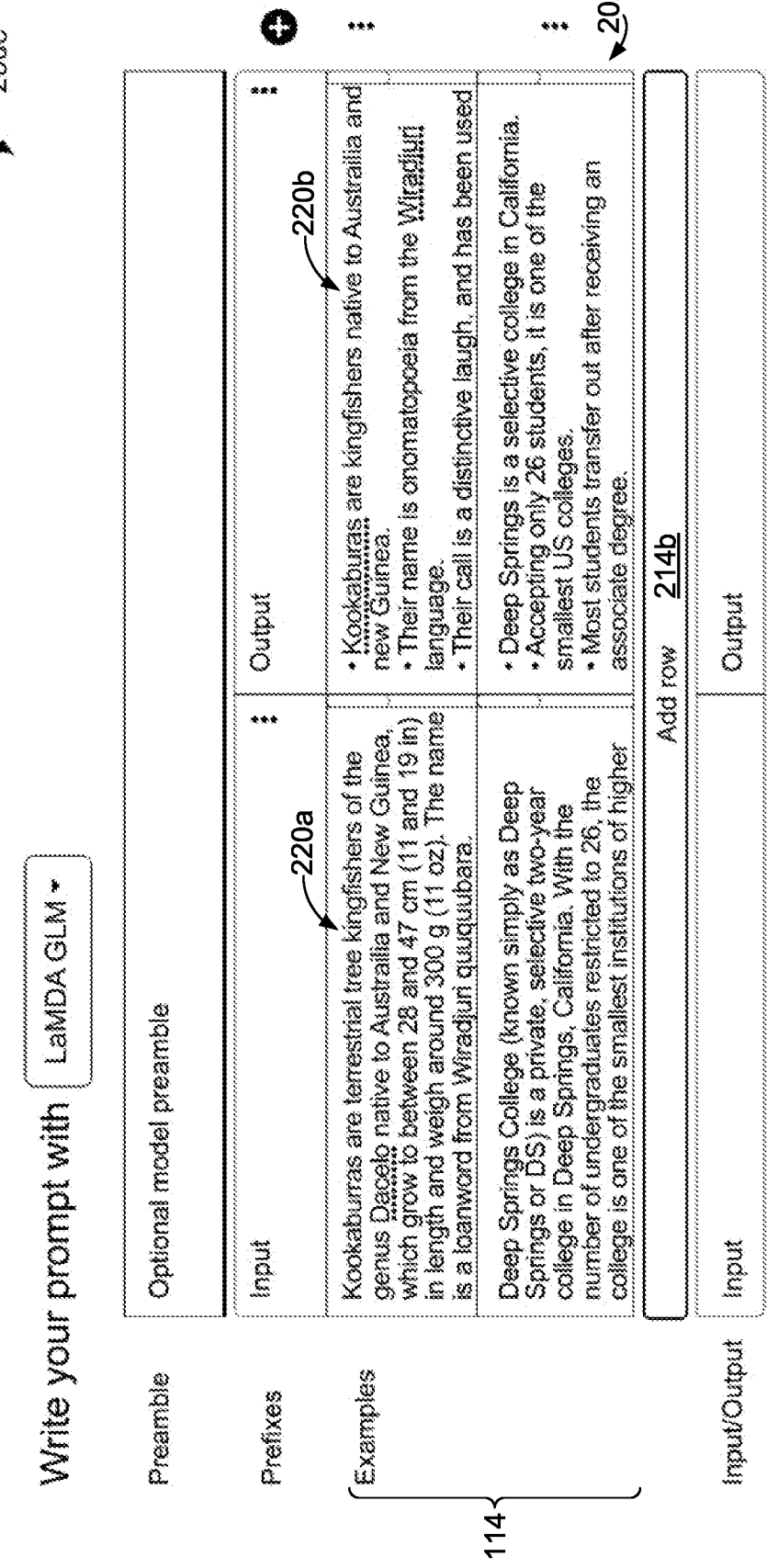

Referring now to FIG. 2A, an example structured prompt 200, 200*a* includes one or more user input fields 210 representing one or more training samples 114 (see FIG. 2C). Each user input field 210 includes a first corresponding text input field 212*a* for capturing text representative of corresponding input text, and a second corresponding text input field 212*b* for capturing corresponding ground-truth output text for the corresponding input text. In this example, the structured prompt 200*a* also includes a model selection user input element 214*a* that allows the user 12 to select a pre-trained ML model from among multiple different ML models. Here, the user 12 has selected the "LaMDA GLM" ML model as the pre-trained ML model via a drop down box. The ML model generator 120 generates the ML model 130 by adjusting one or more coefficients of the selected pre-trained ML model based on the training samples 114.

Referring now to FIG. 2B, an example structured prompt 200, 200*b* includes input text 220*a* provided by the user 12 as example input text for the ML model 130. Similarly, the structured prompt 200*b* includes ground-truth output text 220*b* provided by the user 12 as ground-truth output text 220*b* for the ML model 130 for the input text 220*a*. That is, the input text 220*a* and the ground-truth output text 220*b* collectively represent a paired training sample 114 for adjusting a pre-trained ML model for generating the ML model 130.

Referring now to FIG. 2C, an example structured prompt 200, 200*c* includes a plurality of training samples 114 that have been provided by the user 12. In this particular example, the user 12 provided the one or more training samples 114 in rows of a table (202) of the structured prompt 200*c*. Here, the structured prompt 200*c* also includes a row addition user input element 214*b* (e.g., a selectable button) that may be activated by the user 12 for indicating a request to add an additional row (and corresponding text input fields 212*a*, 212*b*) to the table (202) for entering additional training samples 114. The user 12 may provide any number of training samples 114, such as three to five.

Figure 2D:
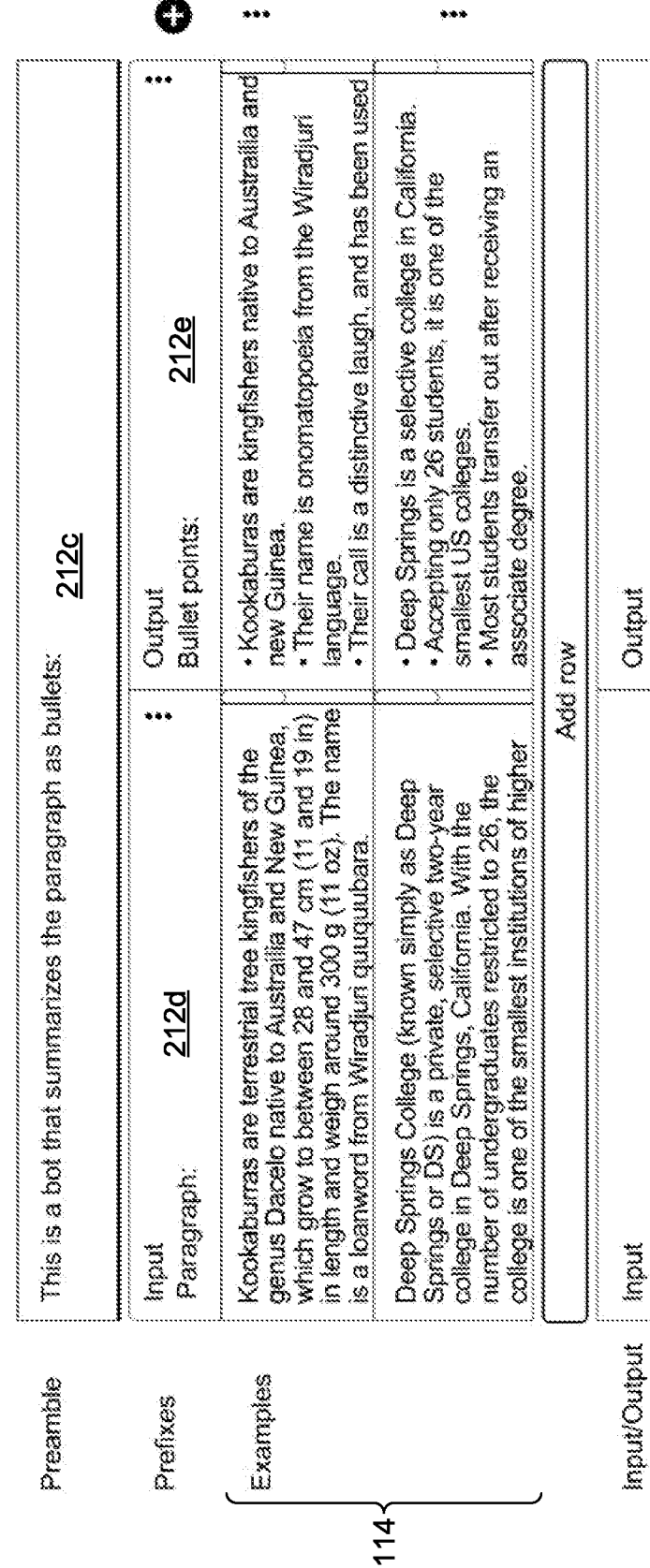

Referring now to FIG. 2D, an example structured prompt 200, 200*d* includes additional text input fields, such as a preamble text input field 212*c*, an input-prefix text input field 212*d*, and/or an output-prefix text input field 212*e*. The preamble text input field 212*c* allows the user 12 to enter text that describes or identifies the ML model 130, while the input-prefix text input field 212*d* and the output-prefix text input field 212*e* allow the user 12 to enter text that describes or identifies the text input fields 212*a* and the text output fields 212*b*, respectively.

Figure 2E:
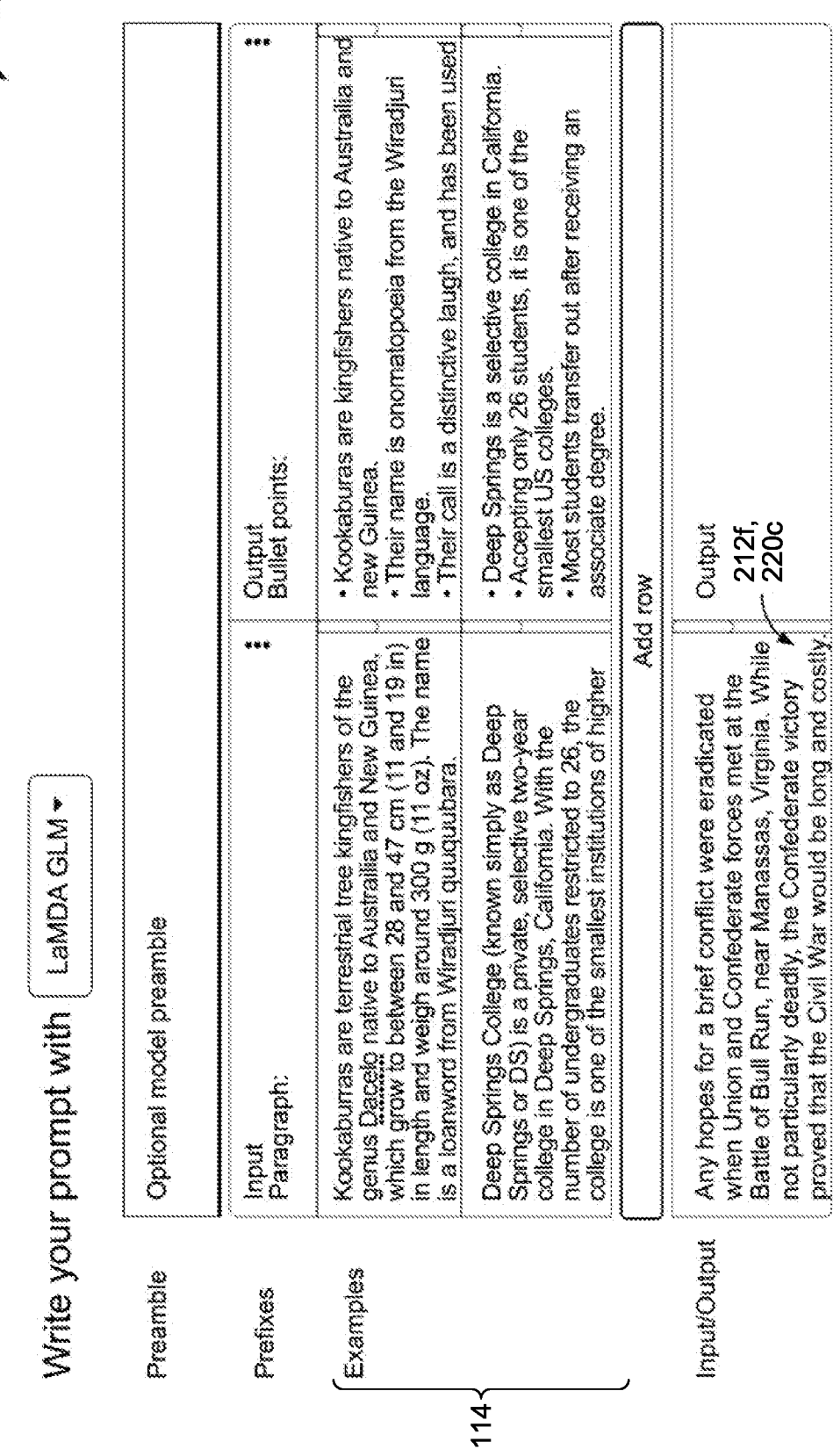

Referring now to FIG. 2E, an example structured prompt 200, 200*e* includes a test-input text input field 212*f* for capturing test input text 220*c* to be provided to the ML model during testing of the ML model 130. In some examples, the IDE 110 may automatically populate some or all of the text of the user input fields 210 or the text input fields 212 from an imported structured data file (e.g., from a spreadsheet, or a comma-separated values (CSV) file).

The user 12 may provide one or more of the training samples 114 to the IDE 110 via an additional user input element within a structured prompt 200 (not shown for clarity of illustration), such as a "Run" button or "Execute" button or the like. The ML model generator 120, in response to receiving the one or more training samples 114, adjusts the ML model 130 using the one or more training samples 114. In some examples, the ML model generator 120 receives the test input text 220*c* simultaneously with the training samples 114.

Referring now to FIG. 2F, another example structured prompt 200, 200*f* includes a text output field 232 for displaying generated test output text 230. After the ML model 130 is generated, the ML model generator 120 processes the test input text 220*c* with the generated ML model 130 to generate the test output text 230 that is displayed in the text output field 232 of the structured prompt 200*f*. In this particular example, the ML model 130 reformatted the test input text 220*c* into bulleted formatted test output text 230. The user 12 may continue to provide new training samples 114, refine existing training samples 114 (i.e., update or otherwise modify previously provided training samples 114), or refine test input text 220*c* to further adjust the ML model 130 until the performance of the ML model 130 is satisfactory (e.g., until the test output text 230 is satisfactory). For example, the user 12 may initially provide three training samples 114 and after testing the ML model 130 via the test input text 220*c*, provide an additional two training samples 114 or refine the three training samples 114 to improve the adjustment of the ML model 130.

Figure 3:
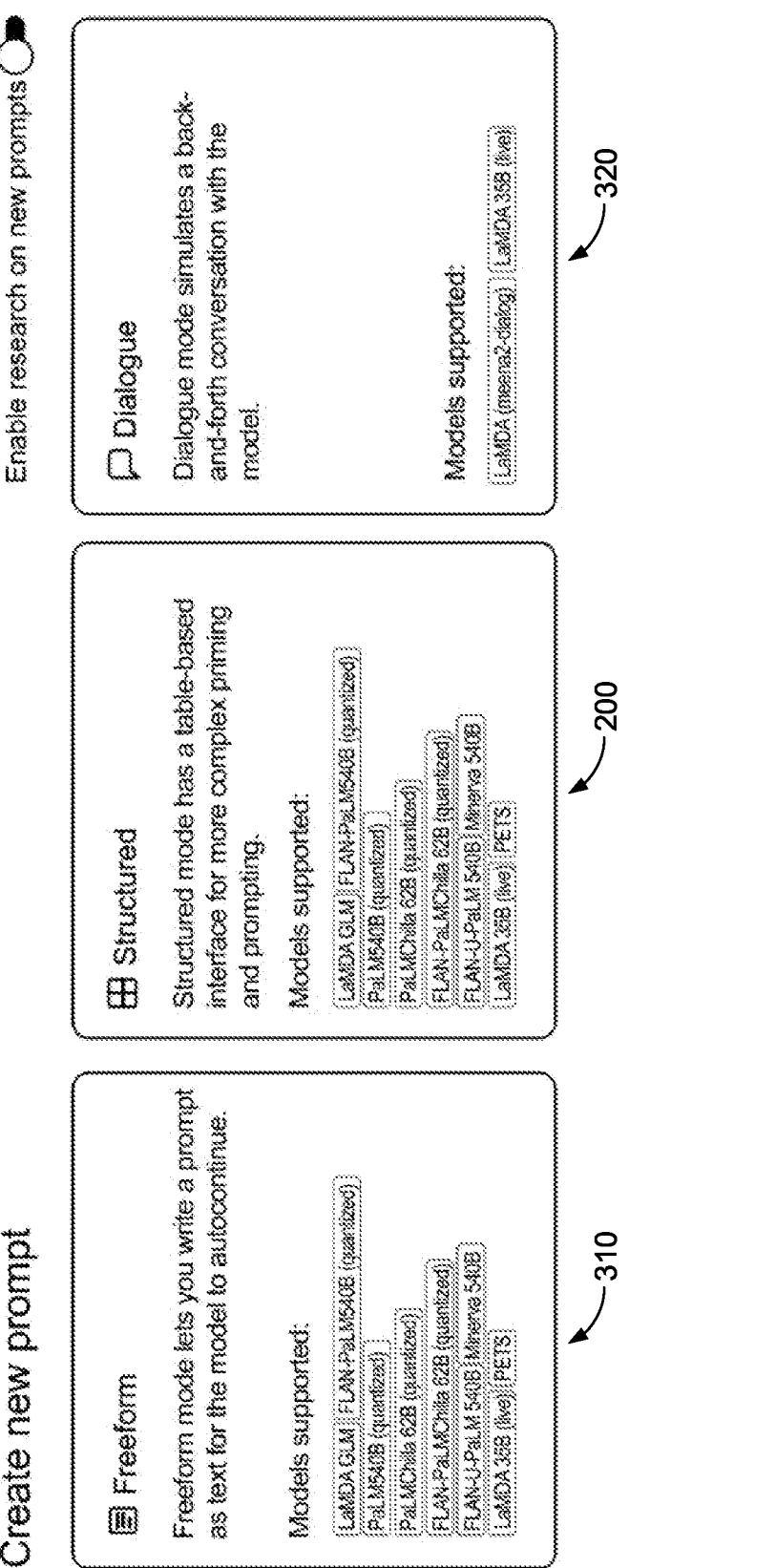
FIG. 3 is a schematic view of an additional example structured prompt.

Referring now to FIG. 3, the IDE 110 may provide other prompts to the user device 10 in addition to or alternative to the structured prompt 200. For example, in FIG. 3, the user 12 may select from a freeform prompt 310, the structured prompt 200, and/or a dialog prompt 320. Each prompt may support a different variety of ML models 130 and provide different user input fields 210 or text input fields 212 to allow the user 12 to quickly and easily provide the ML model generator 120 with the information necessary to generate or build or tailor different ML models 130 for the user 12. In some examples, the IDE 110 provides prompt templates or prompt suggestions based on a brief description from the user 12 of any goals to be accomplished. Here, selecting one of the prompts 200, 310, 320 may cause the request indication 20 indicating a GUI interaction by the user within the GUI 14 presented on the user device 10 to be sent to the IDE 110 to trigger providing, to the user device 10, a structured prompt response 112 configured to cause the user device 10 to display, within the GUI 14, a structured prompt 200 including a plurality of user input fields 210 or text input fields 212.

FIG. 4 is a flowchart of an exemplary arrangement of operations for a method 400 of generating an ML model using an IDE. The operations may be performed by data processing hardware 510 (e.g., the data processing hardware 16 of the user device 10 or the data processing hardware 42 of the remote system 40) based on executing instructions stored on memory hardware 520 (see FIG. 5) (e.g., the memory hardware 18 of the user device 10 or the memory hardware 46 of the remote system 40).

The method 400 includes, at operation 402, receiving, from a user device 10, a request indication 20 indicating a GUI interaction by a user 12 within a GUI 14 presented on the user device 10. At operation 404, the method 400 includes, in response to the request indication 20, providing, to the user device 10, a structured prompt response 112 configured to cause the user device 10 to display, within the GUI 14, a structured prompt 200 including one or more user input fields 210, each user input field 210 of the one or more user input fields 210 representing a corresponding training sample 114 and including a first corresponding text input field 212*a* for capturing text representative of corresponding input text 220*a* to be provided to the ML model 130, and a second corresponding text input field 212*b* for capturing text representative of corresponding ground-truth output text 220*b* for the corresponding input text.

The method 400 includes, at operation 406, includes receiving, from the user device, one or more training samples 114, each of the one or more training samples 114 comprising captured text from the first corresponding text input field 212*a* and the second corresponding text input field 212*b*. At operation 408, the method 400 includes, in response to receiving the one or more training samples 114, adjusting the ML model 130 using the one or more training samples 114.

The method 400 includes, at operation 410, receiving, from the user device 10, test input text 220*c* representative of captured text from one of the one or more user input fields 210. At operation 412, the method 400 includes generating, using the ML model 130, test output text 230 based on the test input text 220*c* and, at operation 414, providing, to the user device 10, the test output text 230 to cause the user device 10 to display, within the GUI 14, the test output text 230.

Figure 5:
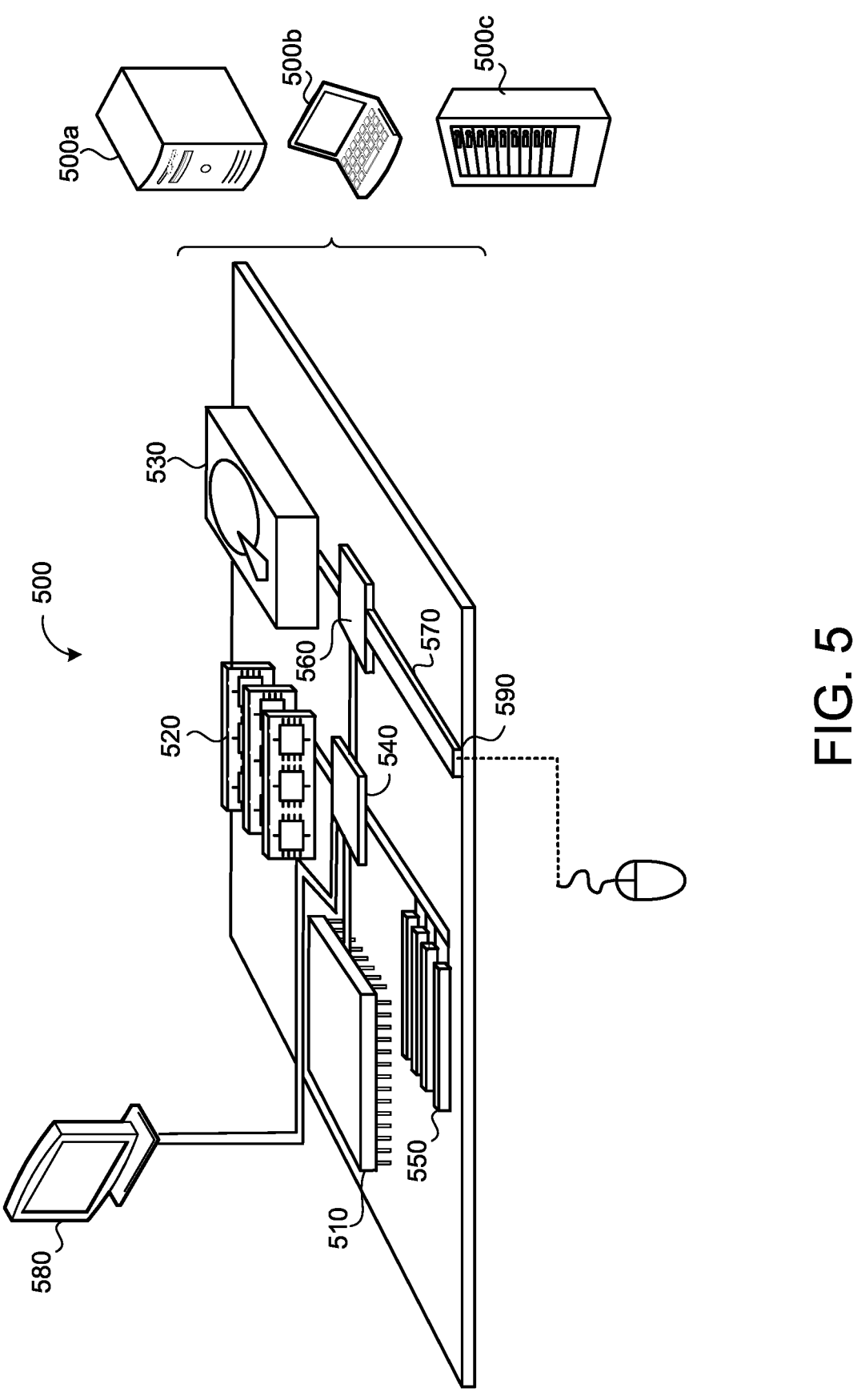
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 16 and/or 42, memory 520 (i.e., memory hardware) that can be used to implement the memory hardware 18 and/or 44, a storage device 530 (i.e., memory hardware) that can be used to implement the memory hardware 18 and/or 44, a high-speed interface/controller 540 connecting to the memory 520 and high-speed expansion ports 550, and a low speed interface/ controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, from a user device, a request indication indicating a graphical user interface (GUI) interaction by a user within a GUI presented on the user device;
   in response to the request indication, providing, to the user device, a structured prompt response configured to cause the user device to display, within the GUI, a structured prompt comprising one or more user input fields, each of the user input fields representing a corresponding training sample and comprising:
      a first corresponding text input field for capturing text representative of corresponding input text to be provided to a machine learning (ML) model; and a second corresponding text input field for capturing text representative of corresponding ground-truth output text for the corresponding input text;
   receiving, from the user device, one or more training samples, each of the one or more training samples comprising captured text from the first corresponding text input field and the second corresponding text input field;
   in response to receiving the one or more training samples, adjusting the ML model using the one or more training samples;
   receiving, from the user device, test input text representative of captured text from one of the one or more user input fields;
   generating, using the ML model, test output text based on the test input text; and
   providing, to the user device, the test output text to cause the user device to display, within the GUI, the test output text.

2. The method of claim 1, wherein the structured prompt further comprises a model selection input element allowing selection of one of a plurality of different ML models.

3. The method of claim 1, wherein the structured prompt further comprises a preamble text input field for identifying the ML model.

4. The method of claim 1, wherein adjusting the ML model comprises using one-shot learning or few-shot learning based on the corresponding training samples.

5. The method of claim 1, wherein the operations further comprise:
   generating computer code for calling an application programming interface (API), the API configured to provide access to the ML model; and
   providing the computer code to the user device.

6. The method of claim 5, wherein the operations further comprise:
   receiving, via the API, second test input text;
   generating, using the ML model, second test output text based on the second test input text; and
   returning, via the API, the second test output text.

7. The method of claim 1, wherein each training sample of the one or more training samples comprises a row of a table of the structured prompt.

8. The method of claim 7, wherein the structured prompt further comprises a row addition user input element for indicating a request to add an additional row to the table.

9. The method of claim 1, wherein the structured prompt further comprises:
   an input-prefix text input field for capturing text describing the first corresponding text input field; and
   an output-prefix text input field for capturing text describing the second corresponding text input field.

10. The method of claim 1, wherein, after providing the test output text, the operations further comprise:
   receiving, from the user device, one or more additional or refined training samples;
   in response to receiving the one or more additional or refined training samples, further adjusting the ML model using the one or more additional or refined training samples;
   receiving, from the user device, second test input text representative of captured text from one of the one or more user input fields;
   generating, using the ML model, second test output text based on the second test input text; and providing, to the user device, the second test output text configured to cause the user device to display, within the GUI, the second test output text.

11. A system comprising:

data processing hardware; and memory hardware in communication with the data processing hardware, the memory hardware storing instructions that, when executed on the data processing hardware, cause the data processing hardware to perform operations comprising:

receiving, from a user device, a request indication indicating a graphical user interface (GUI) interaction by a user within a GUI presented on the user device;

in response to the request indication, providing, to the user device, a structured prompt response configured to cause the user device to display, within the GUI, a structured prompt comprising one or more user input fields, each of the user input fields representing a corresponding training sample and comprising:

a first corresponding text input field for capturing text representative of corresponding input text to be provided to a machine learning (ML) model; and a second corresponding text input field for capturing text representative of corresponding ground-truth output text for the corresponding input text;

receiving, from the user device, one or more training samples, each of the one or more training samples comprising captured text from the first corresponding text input field and the second corresponding text input field;

in response to receiving the one or more training samples, adjusting the ML model using the one or more training samples;

receiving, from the user device, test input text representative of captured text from one of the one or more user input fields;

generating, using the ML model, test output text based on the test input text; and providing, to the user device, the test output text to cause the user device to display, within the GUI, the test output text.

12. The system of claim 11, wherein the structured prompt further comprises a model selection input element allowing selection of one of a plurality of different ML models.

13. The system of claim 11, wherein the structured prompt further comprises a preamble text input field for identifying the ML model.

14. The system of claim 11, wherein adjusting the ML model comprises using one-shot learning or few-shot learning based on the corresponding training samples.

15. The system of claim 11, wherein the operations further comprise:

generating computer code for calling an application programming interface (API), the API configured to provide access to the ML model; and providing the computer code to the user device.

16. The system of claim 15, wherein the operations further comprise:

receiving, via the API, second test input text;

generating, using the ML model, second test output text based on the second test input text; and returning, via the API, the second test output text.

17. The system of claim 11, wherein each training sample of the one or more training samples comprises a corresponding row of a table of the structured prompt.

18. The system of claim 17, wherein the structured prompt further comprises a row addition user input element for indicating a request to add an additional row to the table.

19. The system of claim 11, wherein the structured prompt further comprises:

an input-prefix text input field for capturing text describing the first corresponding text input field; and an output-prefix text input field for capturing text describing the second corresponding text input field.

20. The system of claim 11, wherein, after providing the test output text, the operations further comprise:

receiving, from the user device, one or more additional or refined training samples;

in response to receiving the one or more additional or refined training samples, further adjusting the ML model using the one or more additional or refined training samples;

receiving, from the user device, second test input text representative of captured text from one of the one or more user input fields;

generating, using the ML model, second test output text based on the second test input text; and providing, to the user device, the second test output text configured to cause the user device to display, within the GUI, the second test output text.

\* \* \* \* \*